United States Patent Office 2,840,540
Patented June 24, 1958

2,840,540

ETHOXYLINE RESIN - HEXACHLOROENDO-METHYLENETETRAHYDROPHTHALIC ANHYDRIDE COMPOSITIONS HAVING LONG POT LIFE

Joseph Rosenberg and Mary Anne Graff, Schenectady, N. Y., assignors to General Electric Company, a corporation of New York No Drawing. Application November 10, 1954
Serial No. 468,160

13 Claims. (Cl. 260—47)

Our invention relates to new and useful resin compositions. More particularly, our invention relates to resin compositions having desirable physical and electrical characteristics and improved pot life.

Epoxy or ethoxyline resins are well known in the art. For example, U. S. Patent 2,324,483 to Castan, discloses epoxy resins comprising the reaction product of phenols having at least two phenolic hydroxy groups and an epihalogenohydrin, e. g. epichlorhydrin (the product being cured to the substantially thermoset stage by the use of a polycarboxylic anhydride or acid such as phthalic anhydride). The resinous reaction products are generally complex resins comprising a polyether derivative of the polyhydric phenol used containing epoxide groups, are known variously as epoxide, epoxy, and ethoxyline resins and are sold, for example, under the trade names of Epon and Araldite resins. Such resins may be easily converted to the substantially thermoset stage by means of a cure accelerator such as phthalic anhydride or other polycarboxylic acids and anhydrides. It has been found that such ethoxyline resins have poor flame-retardant properties, exhibit an undesirable decrease in strength at elevated temperatures, and have increasingly poor electrical properties at elevated temperatures. Copending Rudoff patent application Serial No. 305,913, filed August 22, 1952, now U. S. Patent No. 2,744,845, and assigned to the same assignee as this application, describes the curing of ethoxyline resins in combination with hexachloroendomethylenetetrahydrophthalic anhydride to obtain resins having improved hardness and electrical qualities at high temperatures.

While the properties of improved hardness and desirable electrical qualities at higher temperatures, as obtained by the teaching of the above-cited Rudoff application, are very useful, the pot life of such combinations of ethoxyline and hexachloroendomethylenetetrahydrophthalic anhydride is relatively short, making it imperative that the material be used soon after mixing. If not used within a matter of normally less than an hour the material gels and has limited, if any usefulness at elevated temperatures of about 100° C. to 120° C.

It is, therefore, an object of our invention to provide resin compositions comprising ethoxyline resins and hexachloroendomethylenetetrahydrophthalic anhydride or hexachloroendomethylenetetrahydrophthalic acid which are characterized substantially by the advantages of such materials previously cured with hexachloroendomethylenetetrahydrophthalic anhydride and, in addition, have an improved pot life.

Briefly stated, our invention comprises mixing together a chlorinated phenyl compound and hexachloroendomethylenetetrahydrophthalic anhydride or acid or mixtures of the anhydride and acid, and combining this mixture with an ethoxyline resin to produce a heat-curable resin having an extended pot life. In the following description it will be understood that hexachloroendomethylenetetrahydrophthalic acid may be substituted for the hexachloroendomethylenetetrahydrophthalic anhydride in whole or in part, the equivalent amounts being properly adjusted.

The features of our invention which we believe to be novel are set forth with particularity in the appended claims. Our invention itself, however, both as to its organization and method of operation, together with further objects and advantages thereof, may best be understood by reference to the following description.

The ethoxyline resins defined above as utilized in our invention are well known in the art. They are described in Castan Patents 2,324,483 and 2,444,333, British Patent 518,057, and British Patent 579,698. Generally, the ethoxyline resins described therein are the reaction product of an epihalogenohydrin such as epichlorohydrin and a phenol having at least two phenolic hydroxy groups, such as bis-(4-hydroxy phenyl) dimethylmethane. U. S. Patents 2,494,295; 2,500,600; and 2,511,913 also disclose ethoxyline resins which may be used in connection with the present invention. The above patents are hereby incorporated by reference in this application. The ethoxyline resins used herein contain more than one epoxy group per molecule. They may be prepared by reacting a polyhydric alcohol or phenol, such as hydroquinone, resorcinol, glycerin, and condensation products of phenols with ketones, for example, bis-(4-hydroxy phenol)-2,2-propane with epichlorohydrin. The reaction of epichlorohydrin with bis-(4-hydroxy-phenol)-2,2-propane, for example, is as follows:

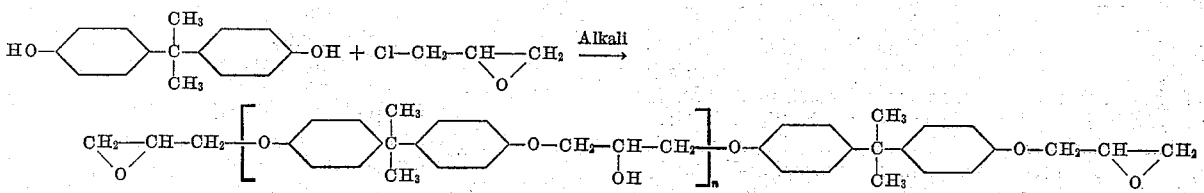

where $n$ has an average value ranging from about 0 to about 7. Such ethoxyline resins containing 1,2-epoxide groups are sold under the name of Epon Resins by Shell Chemical Corporation, or under the name Araldite by Ciba Company. Pertinent data on Epon resins are given in Table I below.

TABLE I

| Epon No. | Epoxide Equivalent | Approximate Esterification Equivalent | M. P., ° C. |
|---|---|---|---|
| 828 | 192 | 80 | 9 |
| 834 | 225–290 | 105 | 20–28 |
| 1001 | 450–425 | 130 | 64–76 |
| 1004 | 905–985 | 175 | 97–103 |
| 1007 | 1,600–1,900 | 190 | 127–133 |
| 1009 | 2,400–4,000 | 200 | 145–155 |
| 1062 | 140–165 |  | Liquid |
| 1064 | 300–375 | 105 | 40–45 |

The chlorinated phenyl compounds which are used in our invention are those containing more than two or at least three chlorine atoms per molecule. Thus trichlorobenzene has been found useful in this respect. The diphenyls, terphenyls, and higher phenyl compounds having at least three chlorine atoms per molecule are also efficacious. For example, trichlorodiphenyl, tetrachlorodiphenyl, pentachlorodiphenyl hexachlorodiphenyl, etc.

are used to advantage. Similarly, chlorinated terphenyls may be used, decachloroterphenyl being typical of such compounds, as well as quaterphenyls etc. Mixtures of such chlorinated materials may also be used.

The use of hexachloroendomethylenetetrahydrophthalic anhydride as a curing agent for ethoxyline resins is set forth in copending Rudoff application, Serial No. 305,913, filed August 22, 1952 and assigned to the same assignee as the present application which is mentioned above. This application is incorporated herein by reference. In this reference application the hexachloroendomethylenetetrahydrophthalic anhydride is added to the ethoxyline resin in amounts of from five percent to 70 percent of the total weight of the combination. Preferably the hexachloroendomethylenetetrahydrophthalic anhydride and ethoxyline resin are in such proportions that there are from 0.8 to 1.2 equivalents of hexachloroendomethylenetetrahydrophthalic anhydride for each expoxide equivalent in the ethoxyline resin. The hexachloroendomethylenetetrahydrophthalic anhydride is used in the present application in the same amounts. Hexachloroendomethylenetetrahydrophthalic acid in equivalent amounts can be substituted for the anhydride in whole or in part. Where reference is made hereinafter to hexachloroendomethylenetetrahydrophthalic anhydride alone in connection with the present invention, it will, therefore, be understood that such reference includes hexachloroendomethylenetetrahydrophthalic acid in equivalent amounts.

We have unexpectedly found that by mixing or dissolving hexachloroendomethylenetetrahydrophthalic anhydride or acid in chlorinated phenyl compounds prior to its addition to the ethoxyline resin the pot life of the resulting resin mix is considerably lengthened permitting greater latitude in the use of the resin. Furthermore, the viscosity of a resin such as Epon 834 is substantially reduced from that approximating an SAE 40 oil using hexachloroendomethylenetetrahydrophthalic anhydride alone to that of a light machine oil of SAE 10 or less whereby its usefulness in impregnating coils and other parts having intricate and tiny interstices is greatly enhanced. The viscosity of other ethoxyline resins is proportionately reduced depending upon their molecular weights. At the same time the electrical characteristics of the usual hexachloroendomethylenetetrahydrophthalic anhydride ethoxyline resin mixtures are still desirable.

The chlorinated phenyl compound is mixed with the hexachloroendomethylenetetrahydrophthalic anhydride in amounts ranging from about 20 to 70 percent by weight of the hexachloroendomethylenetetrahydrophthalic anhydride. Preferably the chlorinated phenyl compound is heated to a temperature of about 100° C. to 200° C. and the hexachloroendomethylenetetrahydrophthalic anhydride added thereto and dissolved. The hexachloroendomethylenetetrahydrophthalic anhydride-chlorinated phenyl compound mixture is then added to the ethoxyline resin at temperatures ranging from 80° C. to 150° C. in such amounts that the hexachloroendomethylenetetrahydrophthalic anhydride is present as described above in the amount of from about five to 70 percent by weight of the weight of the ethoxyline resin and hexachloroendomethylenetetrahydrophthalic anhydride combination.

The following will illustrate the practice of our invention, it being realized that the specific ingredients used therein, given in parts by weight, are exemplary only and may be replaced in whole or in part by other similar ingredients as taught above.

*Example 1*

Hexachloroendomethylenetetrahydrophthalic anhydride in the amount of 100 parts was dissolved in 20.5 parts of pentachlorodiphenyl which had been heated to 140° C. The resulting solution was added with stirring to 82 parts ethoxyline resin (Epon 834) heated to 140° C. The hexachloroendomethylenetetrahydrophthalic anhydride-pentachlorodiphenyl dissolved almost immediately in the resin whereas in a check run without the pentachlorodiphenyl the same amount of hexachloroendomethylenetetrahydrophthalic anhydride took about ten minutes to dissolve in a like amount of the ethoxyline resin at 140° C. to 150° C. The final hexachloroendomethylenetetrahydrophthalic anhydride-pentachlorodiphenyl-ethoxyline resin mixture had a viscosity about that the SAE 10 oil and was cured by heating for 18 hours at 150° C.

*Example 2*

Hexachloroendomethylenetetrahydrophthalic anhydride in the amount of 95 parts was added to 27.2 parts of pentachlorodiphenyl which had been heated to about 140° C. The resulting solution was added with mixing to 77.7 parts of ethoxyline resin (Epon 834) which had been heated to 140° C. and dissolved therein immediately. The final product has a viscosity similar to that of Example 1 and was cured in a like manner.

*Example 3*

Hexachloroendomethylenetetrahydrophthalic anhydride in the amount of 97.6 parts was dissolved in 20 parts of pentachlorodiphenyl heated to 145° C. The solution was poured into and mixed with 80 parts ethoxyline resin (Epon 834). The resultant solution which formed immediately had a viscosity like that of Example 1 and cured similarly.

*Example 4*

Hexachloroendomethylenetetrahydrophthalic anhydride in the amount of ten parts was dissolved in five parts of decachloroterphenyl at 155° C. The solution was added to 12.2 parts of ethoxyline resin (Epon 834) giving a mix which cured similarly to that of Example 1 and had a similar viscosity.

The cured resins formed from Examples 1 through 4 above are instantaneously self-extinguishing when tested for fire retardancy in accordance with ASTR D635—44. Their heat distortion point when determined according to ASTM D643 is about 138° C. Their 60 cycle power factor at 100° C. is about 0.66%.

While the heat distortion temperature is some 24° C. lower than for a resin cured solely with hexachloroendomethylenetetrahydrophthalic anhydride and the power factor is about four to five times that of such resins, the longer pot life and lowered viscosity more than offsets such differences for many uses.

The resins of the present invention are decidedly superior to phthalic anhydride-cured resins. A typical phthalic anhydride cured ethoxyline resin (Araldite CN501) had a flammability under the above ASTM test of 0.84 inch per minute, a heat distortion point of 109° C. and a 60 cycle power factor of 0.78% at 100° C.

When the uncured resins of Examples 1 through 4 above were compared as to gel time at 100° C. with a mixture of 91.5 parts ethoxyline resin (Epon 834) and 111 parts hexachloroendomethylenetetrahydrophthalic anhydride mixed to solution at 140° C. the resin of Example 1 had a gel time of 109.3 minutes, that of Example 2 a gel time of 138.5 minutes, that of Example 3 a gel time of about 110 minutes, and that of Example 4 had a gel time of 51 minutes. The above ethoxyline-hexachloroendomethylenetetrahydrophthalic anhydride mixture gelled in 33 minutes. From these data, the usefulness of our new compositions will at once be apparent. All samples were tested at 100° C. with a General Electric gel time meter having a motor driven paddle inserted in the resin which was turned at constant torque until stopped by the gelling of the mix.

As to the curing of our new resin mixtures, it will be realized that such a process is essentially one of time and temperature. Thus our resins may be cured at higher temperatures of up to about 200° C. for shorter times than those shown or at lower temperatures, say conveniently down to about 100° C. for longer times. The curing time will also depend upon the composition of the resin.

While normally the use of hexachloroendomethylenetetrahydrophthalic acid in lieu of hexachloroendomethylenetetrahydrophthalic anhydride in curing ethoxyline resins would result in shrinkage and the evolution of water detracting from the usefulness of the final product, we have unexpectedly found that no such shrinkage or water formation takes place when the acid is used in conjunction with the chlorinated phenyl compounds set forth herein.

If desired, in order to obtain varying qualities in the final product, other materials may be added to our novel and useful resin mixtures. For example, other dicarboxylic acids or anhydrides may be used in conjuction with the hexachloroendomethylenetetrahydrophthalic anhydride or acid, including adipic acid, phthalic anhydride, and other materials which are well known in the art. Some of these materials are set forth in Patent 2,683,131, July 6, 1954, assigned to the same assignee as the present application. For example, up to three parts of phthalic anhydride may be substituted for equivalent parts of hexachloroendomethylenetetrahydrophthalic anhydride or acid without seriously detracting from the characteristics of the resins in the above examples.

If desired, the life of our resins may be further extended by chilling them to room temperature or below and maintaining them at such temperature until ready for use when they are again heated to the working temperature. In such case we prefer to grind or subdivide the resin in the cooled state.

Our new resinous materials may be used as they are in the cast condition. They may also be used in coating or impregnating textiles or glass cloth tapes, acetone, and other well known polar solvents being utilized to dissolve the resins. They can be used to coat metals. Varying concentrations of solvents are used according to the coating and the final characteristics desired. The material to be coated is treated with the solution and then dried and cured.

Our resins are also useful in preparing laminates, adhesives, and the like. Filler materials of various kinds can also be added to the resins described herein to make structures or compositions having desired properties. For example, they can be filled with magnetic powders, silica, mica, asbestos, clay, carbon, graphite, etc. Many other uses of such resins will occur to those skilled in the art.

While we have described this invention with particular connection with certain examples, we wish it to be understood that we desire to protect in the following claims all variations of our invention which do not depart from the spirit or scope thereof.

What we claim as new and desire to secure by Letters Patent of the United States is:

1. A composition of matter comprising the reaction product of (1) a complex epoxide resin containing 1,2-epoxide groups and comprising a polyether of a polyhydric organic compound selected from the class consisting of polyhydric alcohols and phenols having at least two phenolic hydroxy groups and (2) a composition comprising (a) a material selected from the class consisting of chlorinated benzene and chlorinated polyphenyls having at least three chlorine atoms per molecule and mixtures thereof and (b) a material selected from the class consisting of hexachloroendomethylenetetrahydrophthalic anhydride, and hexachloroendomethylenetetrahydrophthalic acid and mixtures thereof, the amount of (a) being from about 20 to 70 percent, by weight, of (b), and the amount of (b) being from about 5 to 70 percent, by weight, of said complex epoxide resin.

2. A composition of matter comprising the reaction product of (1) a complex epoxide resin containing 1,2-epoxide groups and comprising a polyether of a polyhydric organic compound selected from the class consisting of polyhydric alcohols and phenols having at least two phenolic hydroxy groups and (2) a composition comprising (a) a material selected from the class consisting of pentachlorodiphenyl, hexachlorodiphenyl, decachloroterphenyl, tetrachlorodiphenyl, trichlorodiphenyl and mixtures thereof and (b) a material selected from the class consisting of hexachloroendomethylenetetrahydrophthalic anhydride and hexachloroendomethylenetetrahydrophthalic acids and mixtures thereof, the amount of (a) being from about 20 to 70 percent, by weight, of (b), and the amount of (b) being from about 5 to 70 percent, by weight, of said complex epoxide resin.

3. A composition of matter comprising the reaction product of (1) a complex epoxide resin containing 1,2-epoxide groups and comprising a polyether of a polyhydric organic compound selected from the class consisting of polyhydric alcohols and phenols having at least two phenolic hydroxy groups and (2) a composition comprising (a) pentachlorodiphenyl and (b) materials selected from the class consisting of hexachloroendomethylenetetrahydrophthalic anhydride and hexachloroendomethylenetetrahydrophthalic acids, and mixtures thereof, the amount of (a) being from about 20 to 70 percent, by weight, of (b), and the amount of (b) being from about 5 to 70 percent, by weight, of said complex epoxide resin.

4. A composition of matter comprising the reaction product of (1) a complex epoxide resin containing 1,2-epoxide groups and comprising a polyether of a polyhydric organic compound selected from the class consisting of polyhydric alcohols and phenols having at least two phenolic hydroxy groups and (2) a composition comprising (a) decachloroterphenyl and (b) a material selected from the class consisting of hexachloroendomethylenetetrahydrophthalic anhydride, hexachloroendomethylenetetrahydrophthalic acid and mixtures thereof, the amount of (a) being from about 20 to 70 percent, by weight, of (b), and the amount of (b) being from about 5 to 70 percent, by weight, of said complex epoxide resin.

5. A composition of matter comprising the reaction product of (1) a complex epoxide resin containing 1,2-epoxide groups and comprising a polyether of a polyhydric organic compound selected from the class consisting of polyhydric alcohols and phenols having at least two phenolic hydroxy groups and (2) a composition comprising (a) tetrachlorodiphenyl and (b) a material selected from the class consisting of hexachloroendomethylenetetrahydrophthalic anhydride, hexachloroendomethylenetetrahydrophthalic acid and mixtures thereof, the amount of (a) being from about 20 to 70 percent, by weight, of (b), and the amount of (b) being from about 5 to 70 percent, by weight, of said complex epoxide resin.

6. A composition of matter comprising the reaction product of (1) a complex epoxide resin containing 1,2-epoxide groups and comprising a polyether of a polyhydric organic compound selected from the class consisting of polyhydric alcohols and phenols having at least two phenolic hydroxy groups and (2) a composition comprising (a) trichlorodiphenyl and (b) a material selected from the class consisting of hexachloroendomethylenetetrahydrophthalic anhydride, hexachloroendomethylenetetrahydrophthalic acid and mixtures thereof, the amount of (a) being from about 20 to 70 percent, by weight, of (b), and the amount of (b) being from about 5 to 70 percent, by weight, of said complex epoxide resin.

7. A composition of matter comprising the reaction product of (1) a complex epoxide resin containing 1,2-epoxide groups and comprising a polyether of a polyhydric organic compound selected from the class consisting of polyhydric alcohols and phenols having at least two phenolic hydroxy groups and (2) a composition comprising (a) hexachlorodiphenyl and (b) a material selected from the class consisting of hexachloroendomethylenetetrahydrophthalic anhydride, hexachloroendomethylenetetrahydrophthalic acid, and mixtures thereof, the amount of (a) being from about 20 to 70 percent, by weight, of (b), and the amount of (b) being from about 5 to 70 percent, by weight, of said complex epoxide resin.

8. The process which comprises (1) mixing at a temperature of from 80° C. to 150° C. a complex epoxide resin containing 1,2-epoxide groups and comprising a polyether of a polyhydric organic compound selected from the class consisting of polyhydric alcohols and phenols having at least two phenolic hydroxy groups with (2) a composition comprising (a) a material selected from the class consisting of chlorinated benzene and chlorinated polyphenyls having at least three chlorine atoms per molecule and mixtures thereof and (b) a material selected from the class consisting of hexachloroendomethylenetetrahydrophthalic anhydride, hexachloroendomethylenetetrahydrophthalic acid, and mixtures thereof, the amount of (a) being from about 20 to 70 percent, by weight, of (b), and the amount of (b) being from about 5 to 70 percent, by weight, of said complex epoxide resin.

9. The process which comprises (1) mixing at a temperature of from about 80° C. to 150° C. a complex epoxide resin containing 1,2-epoxide groups and comprising a polyether of a polyhydric organic compound selected from the class consisting of polyhydric alcohols and phenols having at least two phenolic hydroxy groups with (2) a composition comprising (a) pentachlorodiphenyl and (b) a material selected from the class consisting of hexachloroendomethylenetetrahydrophthalic anhydride, hexachloroendomethylenetetrahydrophthalic acid, and mixtures thereof, the amount of (a) being from about 20 to 70 percent, by weight, of (b), and the amount of (b) being from about 5 to 70 percent, by weight, of said complex epoxide resin.

10. The process which comprises (1) mixing at a temperature of from about 80° C. to 150° C. a complex epoxide resin containing 1,2-epoxide groups and comprising a polyether of a polyhydric organic compound selected from the class consisting of polyhydric alcohols and phenols having at least two phenolic hydroxy groups with (2) a composition comprising (a) decachloroterphenyl and (b) a material selected from the class consisting of hexachloroendomethylenetetrahydrophthalic anhydride, hexachloroendomethylenetetrahydrophthalic acid, and mixtures thereof, the amount of (a) being from about 20 to 70 percent, by weight, of (b), and the amount of (b) being from about 5 to 70 percent, by weight, of said complex epoxide resin.

11. The process which comprises (1) mixing at a temperature of from about 80° C. to 150° C. a complex epoxide resin containing 1,2-epoxide groups and comprising a polyether of a polyhydric organic compound selected from the class consisting of polyhydric alcohols and phenols having at least two phenolic hydroxy groups with (2) a composition comprising (a) trichlorodiphenyl and (b) a material selected from the class consisting of hexachloroendomethylenetetrahydrophthalic anhydride, hexachloroendomethylenetetrahydrophthalic acid, and mixtures thereof, the amount of (a) being from about 20 to 70 percent, by weight, of (b), and the amount of (b) being from about 5 to 70 percent, by weight of said complex epoxide resin.

12. The process which comprises (1) mixing at a temperature of from about 80° C. to 150° C. a complex epoxide resin containing 1,2-epoxide groups and comprising a polyether of a polyhydric organic compound selected from the class consisting of polyhydric alcohols and phenols having at least two phenolic hydroxy groups with (2) a composition comprising (a) tetrachlorodiphenyl and (b) a material selected from the class consisting of hexachloroendomethylenetetrahydrophthalic anhydride, hexachloroendomethylenetetrahydrophthalic acid, and mixtures thereof, the amount of (a) being from about 20 to 70 percent, by weight, of (b), and the amount of (b) being from about 5 to 70 percent, by weight, of said complex epoxide resin.

13. The process which comprises (1) mixing at a temperature of from about 80° C. to 150° C. a complex epoxide resin containing 1,2-epoxide groups and comprising a polyether of a polyhydric organic compound selected from the class consisting of polyhydric alcohols and phenols having at least two phenolic hydroxy groups with (2) a composition comprising (a) hexachlorodiphenyl and (b) a material selected from the class consisting of hexachloroendomethylenetetrahydrophthalic anhydride, hexachloroendomethylenetetrahydrophthalic acid, and mixtures thereof, the amount of (a) being from about 20 to 70 percent, by weight, of (b), and the amount of (b) being from about 5 to 70 percent, by weight, of said complex epoxide resin.

References Cited in the file of this patent

UNITED STATES PATENTS

| | | |
|---|---|---|
| 2,606,910 | Herzfeld et al. | Aug. 12, 1952 |
| 2,637,716 | Ott | May 5, 1953 |
| 2,744,845 | Rudoff | May 8, 1956 |

FOREIGN PATENTS

| | | |
|---|---|---|
| 511,733 | Belgium | Nov. 29, 1952 |